United States Patent [19]

Puna

[11] 3,892,266
[45] July 1, 1975

[54] METHOD AND MEANS FOR REMOVING SURFACE MATERIAL FROM TREES

[75] Inventor: Erich Puna, Gavle, Sweden

[73] Assignee: Brundell Och Jonsson AB, Gavle, Sweden

[22] Filed: Sept. 10, 1973

[21] Appl. No.: 395,856

[52] U.S. Cl. ............ 144/309 AC; 144/2 Z; 144/3 D
[51] Int. Cl. .............................................. B27c 9/00
[58] Field of Search ........ 144/2 Z, 3 D, 34 R, 34 E, 144/309 AC

[56] References Cited
UNITED STATES PATENTS

| | | | |
|---|---|---|---|
| 3,612,117 | 10/1971 | Kjell | 144/2 Z |
| 3,618,647 | 11/1971 | Stuart | 144/3 D X |
| 3,623,521 | 11/1971 | Shields | 144/3 D X |
| 3,643,709 | 2/1973 | McColl | 144/309 AC X |
| 3,643,711 | 2/1973 | Puna | 144/2 Z |
| 3,709,267 | 1/1973 | Kurelek | 144/3 D X |
| 3,720,248 | 3/1973 | Mellgren | 144/3 D X |
| 3,721,280 | 3/1973 | French et al. | 144/2 Z |
| 3,734,152 | 5/1973 | Shields | 144/3 D |

Primary Examiner—Andrew R. Juhasz
Assistant Examiner—W. D. Bray
Attorney, Agent, or Firm—Flynn & Frishauf

[57] ABSTRACT

Apparatus for delimbing and/or debarking trees includes a boom structure on which a pair of cutting heads are slidably mounted. Means is provided on the boom structure for causing the blades of surface material removing heads, such as cutting heads, to selectively engage a tree. The heads are moved along the boom in opposing directions in such a manner that the heads respectively remove surface material, such as limbs and/or bark, from the upper and lower portions of the tree. In accordance with a preferred embodiment, the boom is a fixed length boom and the heads travel toward the ends of the boom during the surface material removing operation. A novel material removing head having simplified means for engaging and disengaging same from the tree is also provided. The boom structure may be fixedly located or mounted on a vehicle.

54 Claims, 11 Drawing Figures

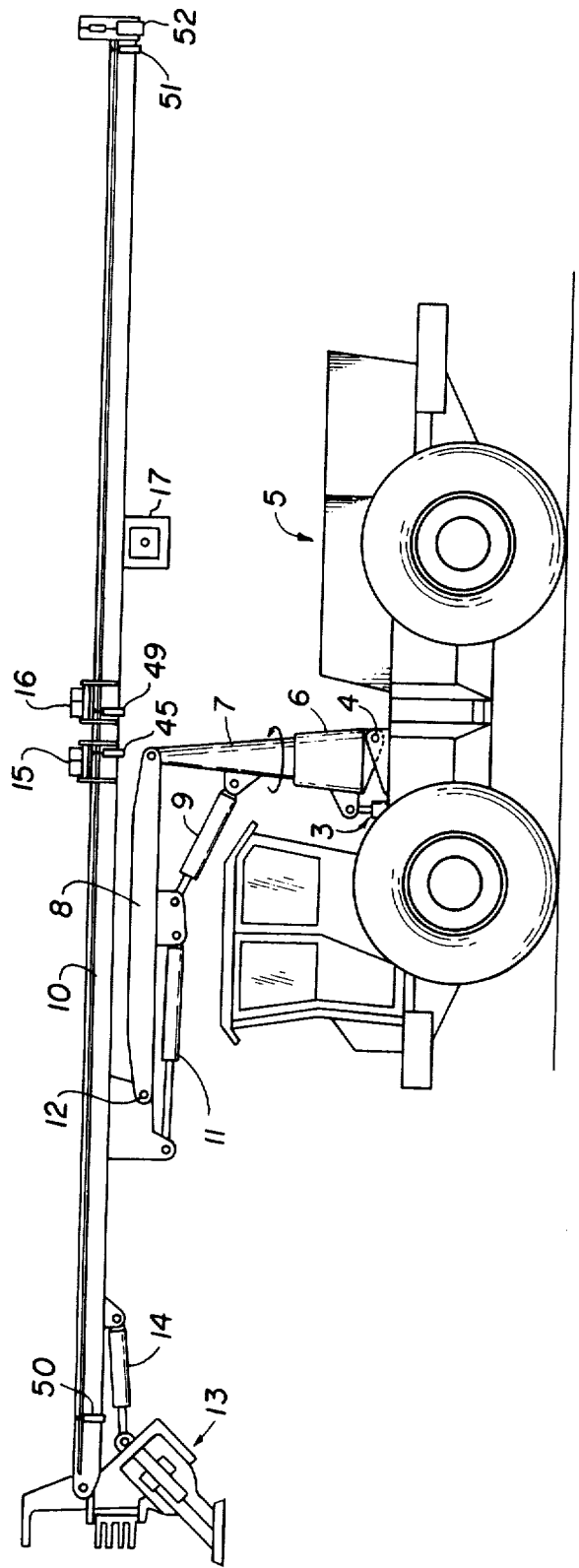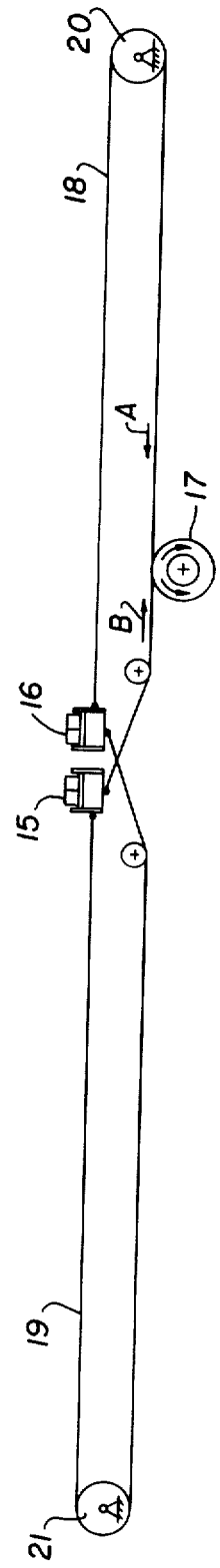

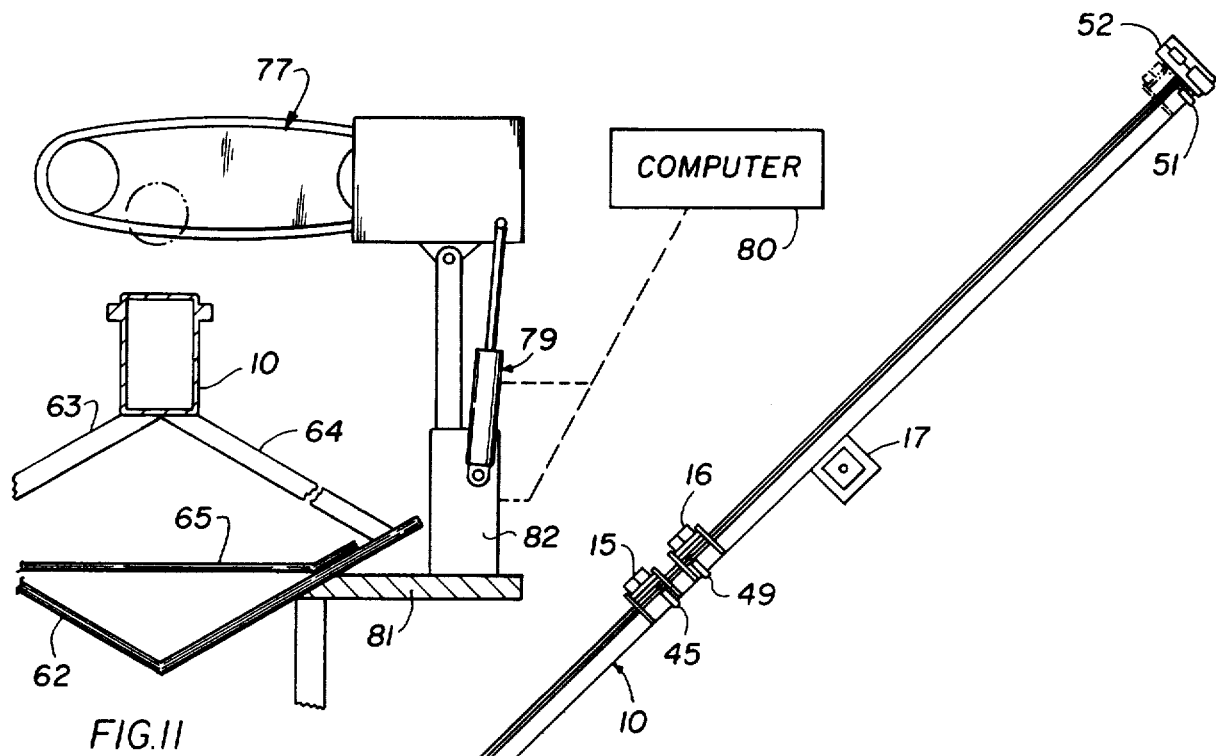
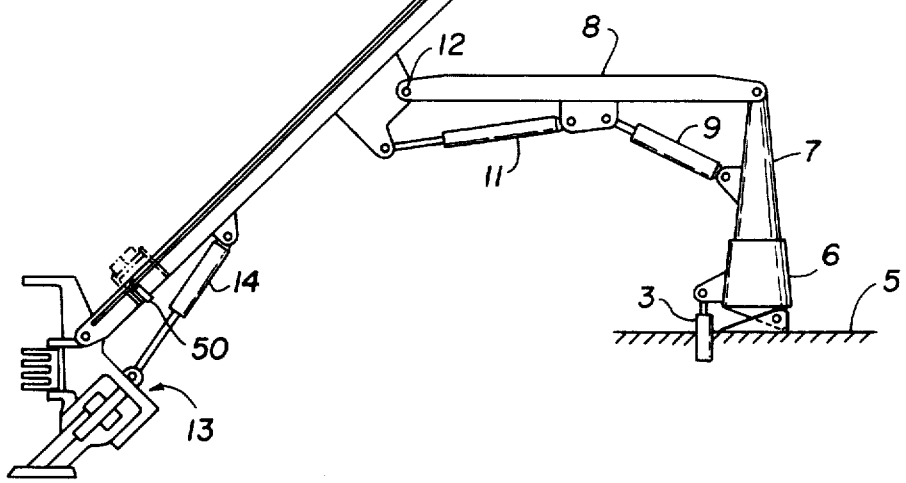
FIG.11
FIG.2

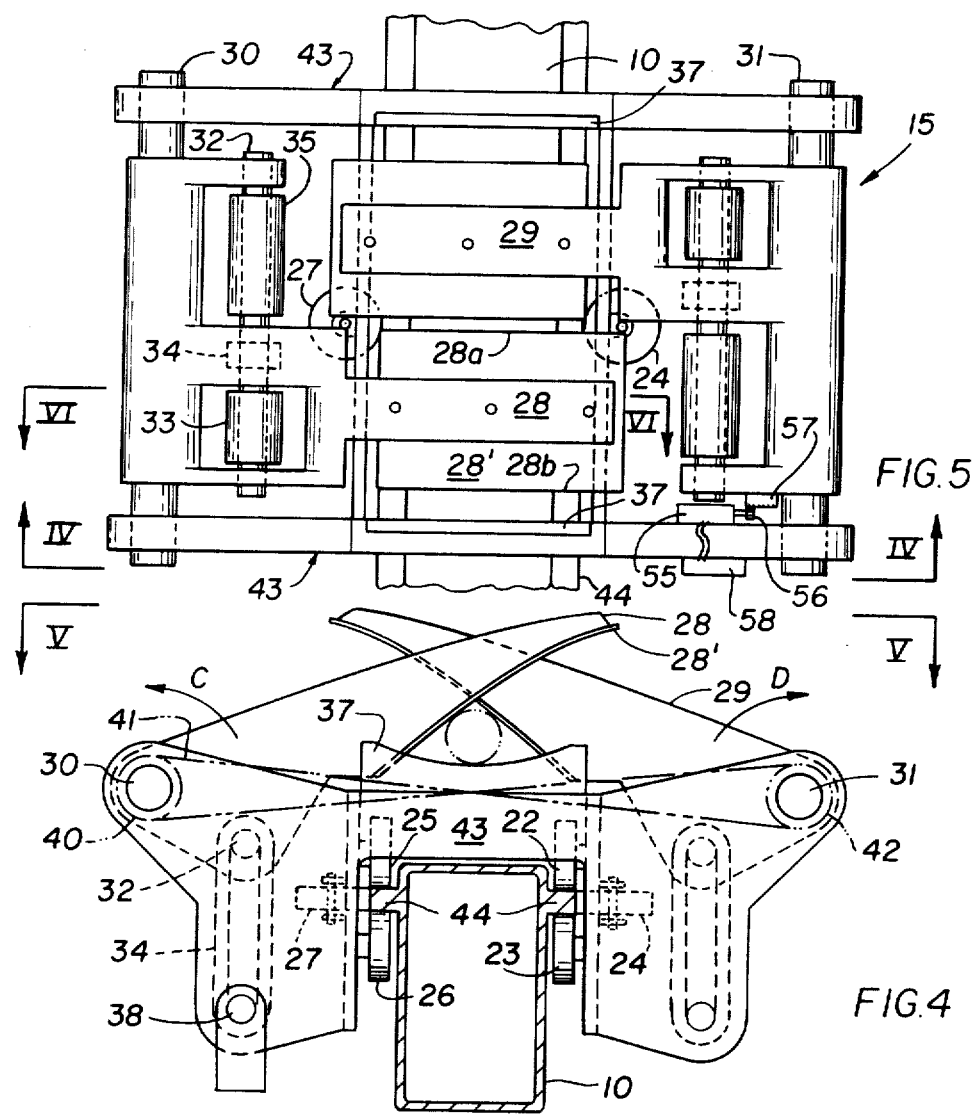
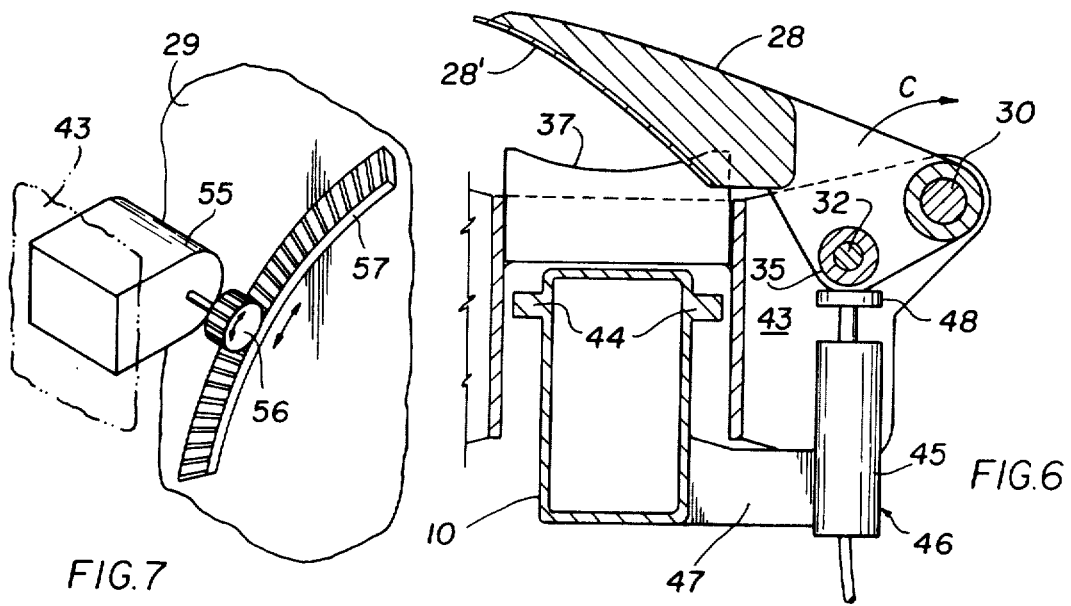
FIG. 5
FIG. 4
FIG. 7
FIG. 6

METHOD AND MEANS FOR REMOVING SURFACE MATERIAL FROM TREES

This invention relates to tree harvesting, and more particularly, to an improved method and apparatus for removing surface material, such as limbs and/or bark, from a tree.

Tree harvesting machines and vehicles for cutting, delimbing and moving trees from the cutting place are generally known in the art. Further, such vehicles having articulated frames are also generally known. However, the prior art machines generally have heavy, extensible booms for supporting the tree for delimbing thereof. Moreover, the prior delimbing mechanims and associated clamp structures were relatively complex and heavy, thus leading to reduced reliability and increased cost.

The main object of the present invention is to provide a tree harvesting method and apparatus in which the apparatus is more compact, simpler in construction and lighter in weight than the prior art devices.

A still further object of the invention is to provide a tree harvesting assembly with an improved delimbing and/or debarking device which is simple in construction and which reduces structural requirements on the machine itself.

The present invention is suitable for use as a tree delimbing device and/or a tree debarking device. In connection with the tree debarking operation, the cutting head of the present invention, if the pressure of the blades against the tree is sufficient, will debark a tree to an extent of about 50 percent. In many instances, this percentage of debarking is completely satisfactory. If an additional percentage of debarking is required, the curvature and/or the shape of the cutting edges of the cutting head can be varied. Also pressure can be varied to vary the degree of debarking. As used herein, the term "surface material" of a tree interchangeably denotes limbs and/or bark. Thus, in general terms, the present invention can be considered to be apparatus for removing surface material from trees, the surface material being limbs and/or bark.

SUMMARY OF THE INVENTION

In accordance with the present invention, apparatus for removing surface material from trees, such as limbs and/or bark, comprises a boom structure which may be pivotally connected to a vehicle, fixedly connected to a vehicle or stationarily located, a shear device which is pivotally connected to an end, such as the lower end, of the boom structure, and a pair of surface material removing heads slidably connected to the boom structure. The slidable heads are provided to perform the surface material removal - that is, the delimbing and/or debarking operation. Further provided is means coupled to the surface material removing heads for causing the blades of the heads to selectively engage a tree, and a means for moving the heads, in the engaged condition, along the boom in opposing directions so as to simultaneously remove surface material from the upper and lower portions of the tree being operated on. In a preferred embodiment, the heads have a rest position intermediate the ends of the boom, and during movement thereof in a surface material operation, the heads are moved towards the end of the boom in said opposing directions. In accordance with a further feature of the invention, the boom is a fixed length boom so as to further simplify construction of the apparatus.

According to another aspect of the present invention, a head for removing surface materials from trees includes a frame structure which is slidably mounted on the boom, and a first knife mounted to the frame. The first knife is preferably fixed to the frame. Further provided is at least one movable knife which is pivotally connected to the frame of the head, and at least one biasing means for imparting a bias force on the at least one movable knife for engaging the at least one movable knife against a tree to perform a material removing (i.e., cutting) operation on surface material projecting from the surface of the bark of the tree. The knives also may remove bark, depending upon the degree of bias force applied to the knives. The improved head arrangement further comprises means mounted on a boom for moving at least the movable knife in a direction against biasing force so as to disengage the knives from a tree. Preferably, the head includes a fixed knife and at least two movable knives. As used herein the term "knife" is used to denote a surface material removal implement and may, for example, be a blunt edge device or any other element providing the desired result.

BRIEF DESCRIPTION OF THE DRAWINGS

FIG. 1 illustrates a typical vehicle-mounted delimbing and/or debarking device according to the present invention;

FIG. 2 shows the boom structure of FIG. 1 carrying the movable cutting heads in greater detail;

FIG. 3 illustrates a means for moving the cutting heads along the length of the boom in FIG. 2;

FIG. 4 illustrates a cutting head slidably mounted on a boom in accordance with the present invention;

FIG. 5 shows a side view of the lefthand portion of the cutting head of FIG. 4 in the direction of the arrows V; and FIG. 6 is a view of the structure of FIG. 5 taken in the direction of the arrows VI;

FIG. 7 illustrates a portion of the cutting head showing the tree diameter detecting means;

FIG. 11 illustrates an adjustable connection of the saw 77 to the boom 10.

DETAILED DESCRIPTION OF THE ILLUSTRATED EMBODIMENTS

Figure 8:
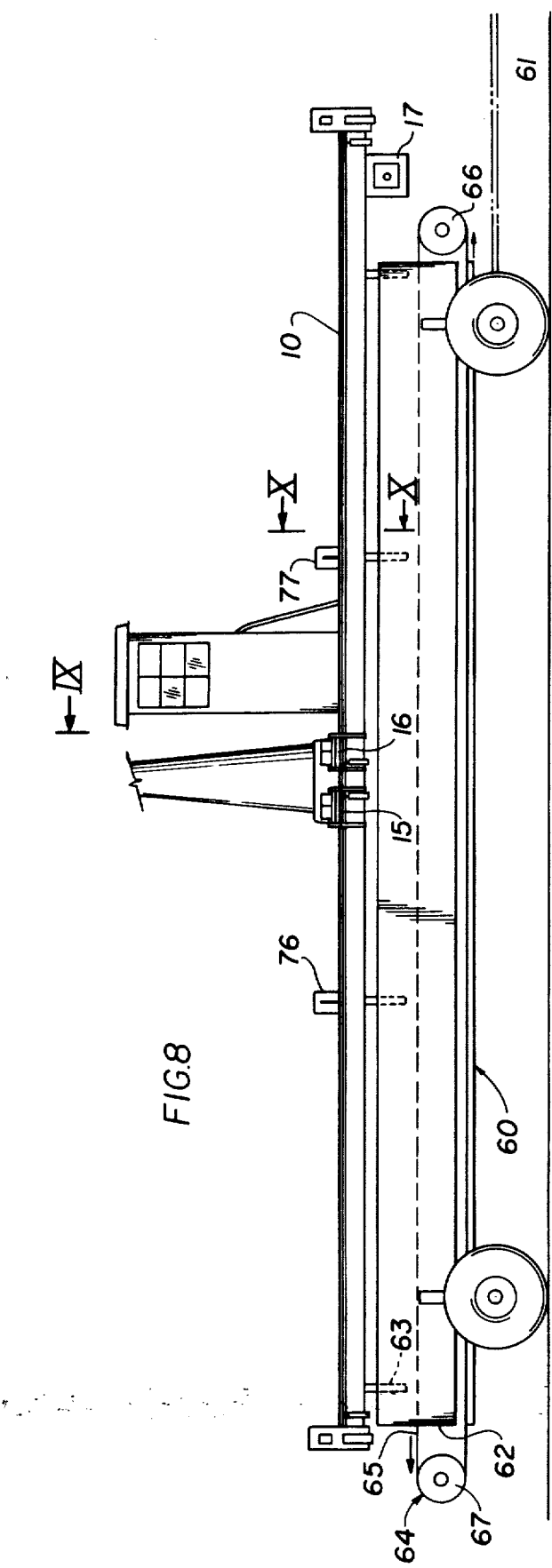
FIG. 8 illustrates another embodiment of the present invention.

Machines of the general type to which the present invention pertains have been described in, for example, U.S. Pat. Nos. 3,720,245; 3,643,711; and 3,540,501. While the machines shown in these prior patents include articulated vehicles, it is clear that the present invention is not limited for use only on articulated vehicles, but could be used on any type of vehicle, as desired.

Referring to FIGS. 1 and 2, there is shown a combination tree shear and surface material removing structure according to one embodiment of the present invention. The illustrated structure includes a vertical upright member 6 which is pivotally secured to the chassis of a vehicle 5 at pivot 4. The angle of inclination of upright 6 is varied by means of a hydraulic mechanism 3. The upright 6 may be attached to the vehicle in a manner similar to the vertical upright 6 shown in U.S. Pat. No. 3,720,245. However, by pivotally connecting member 6 to the vehicle chassis, such as shown in FIG. 1 herein, the orientation of the boom structure can be easily varied so as to maintain elements 6 and 7 vertical, even when going uphill or downhill. This increases the stability of the vehicle.

Extending upwardly from upright member 6 is another vertical member 7 which is rotatable around the longitudinal axis of the member 6. Pivotally connected to the vertical member 7 is a member 8 which is actuated by means of an hydraulic cylinder mechanism 9 so as to be pivotable about the end of the vertical member 7. The member 8 is pivotally connected at 12 to a boom 10 with a hydraulic cylinder mechanism 11 coupled therebetween so as to selectively pivot the boom 10 about the pivot point 12 relative to the member 8. To this point, except for the pivotal connection of upright 6 to the vehicle at pivot point 4, the design of the machine of FIG. 1 is substantially conventional and as described in U.S. Pat. Nos. 3,720,245 and 3,643,711.

Referring particularly to FIG. 2 which shows the boom structure in an operating position similar to the position shown in FIG. 1 of U.S. Pat. No. 3,643,711, pivotally connected to the lower end of the boom 10 is a wood severing mechanism 13. An hydraulic cylinder mechanism 14 is coupled between the lower end of the boom 10 and the severing mechanism 13 so as to selectively tilt the severing mechanism 13 relative to the boom 10. With a construction having a pivotable wood severing mechanism 13, it is possible to sever the tree with the boom 10 in an inclined position, such as shown in FIG. 1 of U.S. Pat. No. 3,643,711. By virtue of this type of structure, it is possible to provide a lighter vehicle for a given maximum size of tree since the boom structure 10 can be maintained in such a position so as to contribute only little to the tilting load acting on the base vehicle during the tree severing and handling operation. After the severing operation, the severing head 13 is tilted relative to the boom 10 by means of the hydraulic mechanism 14 so as to tilt the severed tree onto the boom structure, as shown in FIG. 2 of U.S. Pat. No. 3,643,711. As should be evident from the drawings of said U.S. Pat. No. 3,643,711, the tiltable construction of the severing mechanism 13 relative to the boom 10 makes it possible to limit the outward movement of the center of gravity of the loaded vehicle, even when carrying a severed tree. In conventional severing head and boom arrangements wherein the severing head is not pivotable relative to the boom, the center of gravity of the loaded vehicle is drastically moved outward and requires that the vehicle itself be heavier in weight to prevent tipping thereof during use.

The boom structure 10 of the present invention has a pair of surface material removing heads 15 and 16 thereon for delimbing and/or debarking a tree (i.e., for removing surface material from a tree). The heads 15, 16 are shown in FIG. 2 at their "rest" position inboard of the ends of the boom. The heads 15, 16 are located at the rest position such that when delimbing a tree, for example, each head will move a substantially equal distance relative to the tree over the limbed portion of the tree. Thus, the rest position is usually not the center of the boom 10. After a tree is severed and is tilted back on boom 10, as shown in FIG. 2 of the U.S. Pat. No. 3,643,711, the material removing heads 15 and 16 are actuated and are moved in opposite directions along the boom 10 to cut or shear the limbs off of the tree. By virtue of moving the heads 15 and 16 in opposite directions along the tree, a substantial part of the longitudinal forces involved in delimbing and/or debarking are cancelled out relative to each other, thus reducing the structural requirements on the clamp mechanisms which clamp the tree to the boom structure. A typical mechanism for moving the surface material removing heads 15 and 16 during a delimbing operation is shown in FIG. 3.

In practice, it has been found that the thickest limbs on a tree which is to be delimbed are located at about the portion of the tree just below the lower head 15. Thus, during a delimbing operation, the largest reaction forces against the head occur just below the rest position of the delimbing head 15. Thus, during delimbing, if the severing blade, for example, of the tree severing mechanism is maintained in its closed or partially closed position, the blade or other severing mechanism itself will aid retaining the lower end of the tree against the delimbing shearing forces, thereby still further reducing the structural requirements placed on the lower clamp mechanism itself for holding the tree.

A typical severing mechanism 13 for use in the present invention is illustrated, for example, in U.S. Pat. No. 3,540,501, the contents of which are incorporated herein by reference. The operation of the severing mechanism and clamp mechanism shown in U.S. Pat. No. 3,540,501 is applicable to the present invention substantially without modification and a further detailed discussion thereof is omitted. The severing mechanism 13 may also be a saw-type device rather than the blade-type device shown in U.S. Pat. No. 3,540,501.

In FIGS. 1 and 2, the boom 10 is shown as a fixed length, non-telexcoping (i.e., non-extensible) boom. In many instances, when using the present invention with smaller size trees, it has been found that it is not necessary to use a telescopic boom. This substantially reduces the weight and complexity of the overall system and further, enables the use of the simplified, dual head opposing movement, movable surface material removing head arrangement illustrated in FIG. 1. While this system could be adapted to use with telescoping boom arrangements, greatest simplicity is achieved with a fixed length boom.

Referring to FIG. 3, a typical arrangement for operating heads 15, 16 is shown. When a tree is first severed it is then tilted back onto the boom and the cutters of the heads 15, 16 are actuated so as to cause the cutting implements (such as knives) thereof to bear against the tree. This operation will be described further in greater detail hereinbelow with reference to FIGS. 4–6. After the heads 15, 16 are actuated so as to cause the knives thereof to bear against the tree, a winding drum 17 is operated in a counterclockwise direction so as to cause the cable or wire 18 to move in the direction of arrow A (FIG. 3). This causes the head 16 to move to the right in FIG. 3 and the head 15 to move to the left in FIG. 3. The ends of the cables 18 and 19 are drawn around pulley wheels 20 and 21, respectively. The pulley wheels 20 and 21 are fixedly mounted to the respective end portions of the boom 10. After the delimbing and/or debarking operation and when it is desired to move the heads 15 and 16 back to their initial position as shown in FIGS. 1 and 2, the winding drum 17 is caused to wind in the clockwise direction, thus causing the cable 18 to move in the direction of the arrow B shown in FIG. 3. The winding drum 17 is motor operated as should be apparent. The arrangement of the cables 18, 19 and pulleys 20, 21 insures positive movement of the heads 15 and 16 relative to the boom 10. The boom 10 is not shown in FIGS. 3 for each of illustration. Clearly, the cables 18, 19 may be chains, wires or other elongated elements of suitable characteristics and structural integrity, and are referred to as "cables" for convenience.

At the upper end of the boom 10 is provided a top severing mechanism 52 for severing the top of the tree being operated on. While this is not an indispensable feature of the apparatus, it is desirable in many instances to include such a device.

During operation of the apparatus of the present invention, in some instances, it is desirable to move the heads 15 and 16 back to their rest positions as shown in FIG. 2 with the cutting elements (knives) thereof engaged against the tree after the heads have been moved to their extreme end position. This effectively provides a second material removing pass of the heads over the tree which, in many instances, is very effective in insuring that the tree is delimbed and/or debarked to the desired degree. Depending upon the type of tree being operated on, it is possible for the heads 15, 16 to have a rest position towards the ends of the boom 10 and to have the heads 15, 16 moved towards each other during the initial material removing operation. However, this is not as desirable as the previously described operational techniques since the upper end of the tree generally tapers and will create resistance against the downward movement of the upper head 16. Moreover, if the tree is not tall enough to reach the upper end of the boom, the upper head 16 may not properly engage the tree during movement thereof in the downward direction. Thus, while such a construction is possible, it is less desirable than the operating technique wherein the heads 15 and 16 have a rest position inboard of the ends of the boom.

As shown in FIGS. 4-6, a typical surface material removing head arrangement used in delimbing and/or debarking trees includes a frame member 43 which is movable along the length of the boom 10. The boom 10 has flanges 44 extending therefrom on which the frame 43 is rollably supported. Attached to frame 43 are rollers 22-27 which bear upon respective surfaces of the flanges 44 as shown in FIG. 4 of the drawings. The rollers 24 provide lateral support and the rollers 22, 25 and 23, 26 bear upon the upper and lower surfaces, respectively, of flanges 44. Attached to the frame 43 is a fixed knife 37 and pivotally secured to the frame 43 are pivoting knives 28 and 29. Knives 28 and 29 are respectively pivoted to the frame 43 by pivot posts or rods 30 and 31.

As shown in FIGS. 4 and 5 a spring, such as for example a rubber-band type spring 34, is stretched around a shaft 32 which is coupled with knife 28, the spring 34 being connected at its other end to a post 38 which is secured to the frame 43. This rubber-band type spring 34 biases the movable knife 28 in its closed position, that is, the position in which it bears against the surface of a tree as shown in FIG. 4. A similar structural arrangement is used for the other knife 29. The position of post 38 may be varied to vary the forces applied by the knife against the tree. In order to debark a tree it is necessary to apply higher biasing forces to the knives than for delimbing. Thus, for debarking, the post 38 is adjusted to a lower position relative to the frame to further stretch the spring 34.

FIG. 5 shows a the view of the head mechanism of FIG. 4. As more clearly shown in FIG. 5, the movable knife 28 preferably has a replaceable flat cutter 28'. Preferably, the cutter 28' has operating edges on both end surfaces 28a and 28b so that it may perform a cutting operation during movement in either direction along te boom 10. The movable knife 28 is shown being pivoted relative to the frame 43 by means of a pivot post or shaft 30. Knife 29 is similar in construction.

Further, as shown in FIGS. 5 and 6, the pin or shaft 32 extends in a direction substantially parallel to the boom 10 and has a pair of rollers 33 and 35 mounted thereon. The rollers 33 and 35 are adapted to be acted on by means of a release mechanism, such as an hydraulic mechanism 45, for pivoting the blade 28 in the outward direction (in the direction of the arrow C in FIGS. 4 and 6) so as to release the knives from engagement with the tree. In the illustrated embodiment, when the head 15, 16 is in the rest position, the hydraulic mechanism 45, such as shown in FIGS. 2 and 6, operates so that the piston member 48 moves upwardly against roller 35 to pivot the movable knife 28 in the direction of arrow C (FIG. 6) so as to release the knife 28 from the tree.

The hydraulic mechanism 45 shown in detail in FIG. 6 comprises an hydraulic cylinder 46 which is connected to a source of hydraulic power, the cylinder 46 being attached to the boom 10 by means of, for example, a support plate 47. A piston member 48 is provided for selective movement against the roller 35 so as to pivot the knife 28 about pivot point 30. FIG. 6 illustrates one such hydraulic mechanism 45. However, as shown in FIGS. 1 and 2, additional hydraulic mechanisms 49, 50 and 51 are provided at various locations along the boom so as to selectively operate the knives at said various locations. When the heads 15 and 16 are in their inboard rest position, the hydraulic mechanism 45 and 49 operate against the inboard rollers 35 of the heads 15, 16. However, when the heads 15 and 16 are not at their extreme outboard position, such as shown in broken lines in FIG. 2, the hydraulic mechanisms 50 and 51, which are fixed to the boom 10 respectively operate on the outboard rollers 33 of the heads 15 and 16. The operation of the hydraulic mechanisms against the outboard rollers is identical with that of the hydraulic mechanisms against rollers 35. As many operating hydraulic mechanisms as desired may be placed in different locations along the length of the boom so as to operate the cutting knives when the heads are in registration with the particular hydraulic operating mechanisms. While hydraulic operating mechanisms are illustrated, it should be clear that other types of mechanisms, such as mechanical or electrical mechanisms, for example, can be used in place thereof.

Further provided is a sprocket 40 (shown in FIG. 4) secured to the cutter knife 28 and a chain 41 coupling the sprocket 40 with another sprocket 42 attached to the movable knife 29 so as to synchronize the movement of the two cutters. The chain drive mechanism 40, 41, 42 is such that when the movable knife 28 is moved in the direction of the arrow C in FIG. 4, the movable knife 29 is caused to move in the direction of the arrow D in FIG. 4. Thus, a single operating mechanism such as hydraulic mechanism 45 accomplishes re-lease of both knives from the tree while a single spring 34 can operate both knives against a tree. With such a chain drive coupling, a spring such as 34 may be coupled to one knife and a releasing mechanism can be coupled to the other knife of a given head. It should be clear that other couplings between the knives 28 and 29, such as cable couplings and/or gear couplings could be used in place of chain drive mechanism 40-42.

As shown in FIG. 5, a sensing means could be provided to sense the position of the blades 28, 29 on the tree being operated on. Since the tree is resting on the fixed element 37 (see FIG. 4), the position of the blades 28, 29 against the surface of the tree is a function of the diameter of the tree being operated on. The sensed position of the blades can be fed to a device, such as a computer or other control device, to control a further operation, such as a cutting operation, on the tree being operated on.

Referring to FIG. 7, such a sensing means for generating electrical signals corresponding to the position of the blades comprises a potentiometer 55 mounted to the frame 43 and having a gear 56 attached to the shaft thereof. An arcuate rack 57 is secured to the blade member 29 and is in engagement with the gear 56. Other detecting means, such as photoelectric, electronic or mechanical devices could be used to sense blade position. As the blade 29 pivots about post 31, the gear 56 is caused to rotate, thereby providing electrical outputs from potentiometer 55, which electrical outputs correspond to the position of the blade 29, which in turn is a function of the tree diameter. The potentiometer 55 is coupled to a power source, for example, comprising a battery, or the like (not shown). The electrical information provided by potentiometer 55 may be coupled to a control device, such as a computer or the like, via wires or via a radio transmitter 58 carried by the head 15. The use of such a transmitter 58 enables wireless transmission of the information concerning the tree diameter to the control device, which incorporates an appropriate receiving device.

The information concerning tree diameter can be used by the computer to control a cutting operation so as to cut the tree into variable lengths, which lengths depend upon the tree diameter and the type of wood desired to be obtained from the tree. Such an implementation of the present invention will be described below with reference to FIGS. 8-11.

As illustrated in FIGS. 8-11, the present inventive concept is equally useful in connection with a boom 10 mounted in a fixed position on a vehicle. Likewise, the boom 10 is suitable for mounting at a fixed location, such an implementation not being shown in the present drawings. In FIGS. 8-11, elements corresponding to those elements described in FIGS. 1-6 are given the same reference numeral designation.

Figure 9:
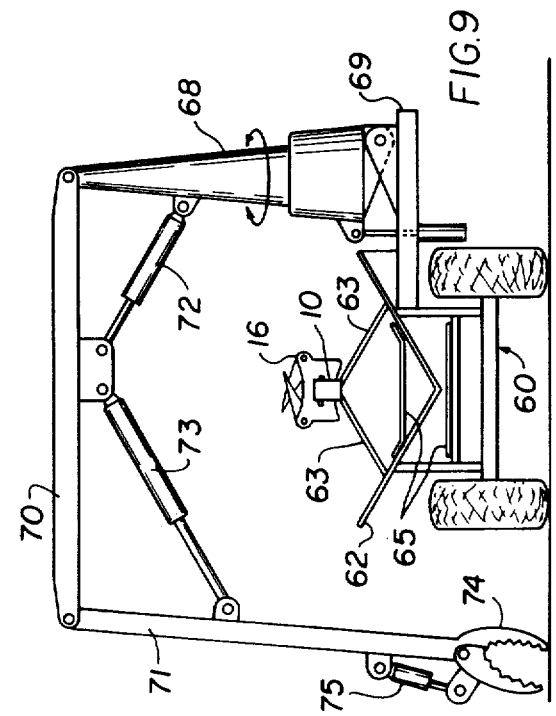
FIG. 9 is a view of the embodiment of FIG. 8 along the lines IX—IX of FIG. 8.

Referring to FIGS. 8 and 9, a vehicle 60 is adapted to be moved by means of, for example, a tow bar 61. The vehicle 60 may also be self-propelled, if desired. The vehicle 60 has a trough 62 mounted thereon, above which is mounted the boom 10 by means of support members 63. Mounted below the boom 10 is a conveyor mechanism 64 which comprises a conveyor belt 65 driven around rolling members 66, 67 by means not shown. The belt 65 is a continuous belt, as should be apparent.

Further connected to the vehicle 60 is a claw mechanism for lifting trees onto the vehicle for surface material removal. The claw device comprises a rotatable upright member 68 which is connected to the vehicle via a support member 69 in substantially the same manner as the upright member 7 is connected to the vehicle 5 of FIG. 1. A member 70 is pivotally connected to the upright member 60 and an additionally member 71 is pivotally connected to the free end of the member 70. An hydraulic mechanism 72 moves the member 70 relative to the upright 68, and an hydraulic mechanism 73 moves the member 71 relative to member 70. Connected to the free end of member 70 is a claw 74 which is hydraulically operated via an hydraulic mechanism 75. As should be apparent from FIG. 9, the claw 74 is operable to grip a tree on the ground, from a pile, or off of a truck, or the like, and to move same onto the boom 10, with the blades of the heads 15, 16 in the open position so as to accept the tree moved thereon. Then, the heads 15, 16 are operated in the normal manner, as described hereinabove, so as to remove surface material from the tree.

The trough 62 has a configuration such that the surface material removed from the tree by means of the heads 15, 16 is caught and is guided onto the conveyor belt 65. The conveyor belt 65 then conveys the removed surface material to a station from which the removed surface material is removed from the site.

Figure 10:
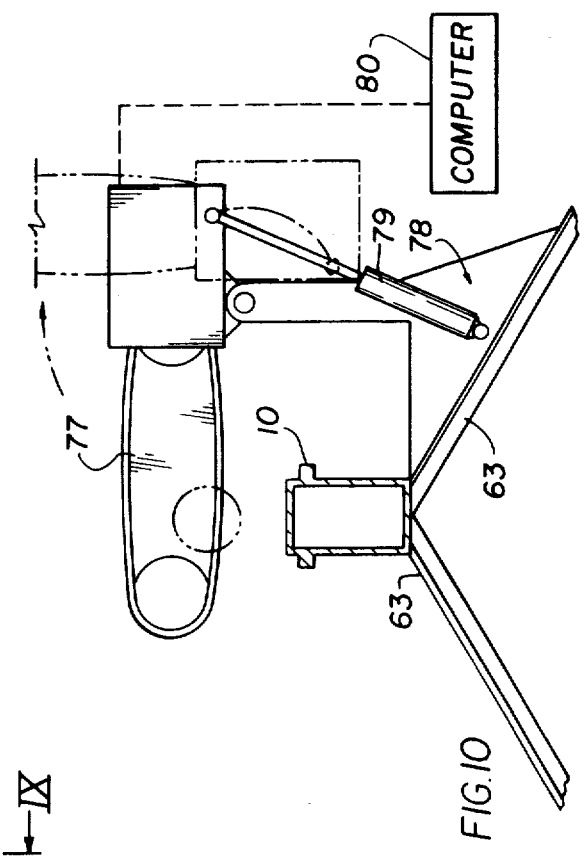
FIG. 10 is a view of the embodiment of FIG. 8 along the line X—X of FIG. 8.

As shown in FIGS. 8 and 10, further provided are saws 76, 77 for cutting the tree which is located on the boom 10 in sections. The saws may be either located in fixed positions along the length of the boom 10, or may be coupled to a cable mechanism for movement thereof along the length of the boom 10. The sows may be either coupled to the same cable mechanism, or may be coupled to independently operated cable mechanisms so as to allow more flexibility in the positioning thereof along the length of the boom 10. Such cable mechanisms should be apparent in view of the illustration of the cable mechanism for the heads 15 and 16 shown in FIG. 3, and are therefore not illustrated in FIGS. 8-10. Other saw moving devices such as motors directly driving the saws along the length of the vehicle via rollers, gears, belts, or the like may be used. FIG. 10 shows a saw 77 fixed to a support 63 of the boom.

Referring to FIG. 10, the saws are pivotable about their support members 78 by means of, for example, respective hydraulic mechanisms 79. While a tree is being located or removed from the boom 10, the saws are pivoted into their upright position (shown in broken lines in FIG. 10) so as to allow clearance for the tree. After the tree is operated on to have its surface material removed, the saws are automatically operated by means of, for example, hydraulic mechanism 79, so as to cut the tree in predetermined lengths.

The positioning of the saws along the length of the vehicle (and consequently along the length of the boom 10) may be accomplished either manually or by means of a control device, such as a computer 80 (see FIG. 11). The computer 80 can be fed information corresponding to the particular types of logs it is desired to obtain from the tree, and as to the diameter of the tree being operated on, and then compute the desired positions of the saws 76, 77 so as to produce the proper types of cutlength logs. It should be clear that the heads 15, 16, in such an instance incorporate position detecting means, such as the potentiometer 55, arcuate rack 57 and transmitter 58 shown in FIG. 5 so as to obtain the diameter information of the tree being operated on along the length of the tree, or the diameter information is otherwise obtained. It should be clear that additional saws such as saws 76, 77 may be mounted to the vehicle, as desired.

As shown in FIG. 11, the saw 77 is mounted on the vehicle member 81 which extends over the range of movement of the saw. The saw base 82 is movably mounted to member 81 and is moved along the length thereof by motors, cables, gears or the like (not shown) under control of computer 80. Hydraulic mechanism 79 may also be operated under control of computer 80 to effect a cutting operation.

The computer 80 may comprise any type of well known computing device which is presently generally used in the lumber industry, such as that provided by H. C. Mason & Associates, Inc. Another type of computer adaptable for use in the present invention is described in the magazine "Business Week," May 5, 1973.

It should be clear that various modifications and variations can be made to the illustrated embodiment within the scope of the present invention as set forth in the accompanying claims. For example, various types of mechanisms for movably engaging the cutting heads with the boom may be used. One typical modification is to eliminate the rollers 24 and 27 and to use flanged rollers 22, 23, 25 and 26, the flanges of these rollers bearing on the outside edge of the flanges 44 of the boom 10. This type of construction will also provide lateral support for the cutting head and would eliminate the necessity of providing additional rollers 24 and 27. Also, as mentioned hereinabove, the invention can be adapted for use with a telescopic boom, if desired. Still further, the saws of FIGS. 8 and 10 may be movably mounted to the boom 10, rather than to the vehicle as shown in FIG. 11. This would be particularly advantageous in certain applications and could be accomplished by mounting saw carrying carriages on boom 10 similar to the manner in which heads 15, 16 are attached to boom 10. Various other modifications, such as using other biasing means in the heads 15, 16, can be made, as should be apparent.

I claim:

1. Apparatus for removing surface material from trees comprising:
    a boom structure;
    a pair of surface material removing heads slidably connected to said boom structure, said heads each carrying removal means for removal of surface material from a tree;
    means coupled to said surface material removing heads for selectively causing said removal means of said heads to engage a tree; and
    means for moving said heads along said boom in opposing directions, said heads simultaneously removing surface material from the upper and lower portions of the tree.

2. Apparatus according to claim 1 comprising severing means connected to an end of said boom.

3. Apparatus according to claim 2 wherein said severing means is pivotally connected to said end of said boom.

4. Apparatus according to claim 3 wherein said severing means is pivotally connected to the lower end of said boom.

5. Apparatus according to claim 2 wherein said severing means remains at least partially in the operative position during removal of surface material by said heads so as to provide a support means for said tree during removal of surface material therefrom.

6. Apparatus according to claim 4 wherein said severing means remains at least partially in the operative position during removal of surface material by said heads so as to provide a support means for said tree during removal of surface material therefrom.

7. Apparatus according to claim 1 wherein said boom is mounted on a vehicle.

8. Apparatus according to claim 1 wherein said boom is pivotally connected to a vehicle.

9. Apparatus according to claim 1 wherein said boom is a fixed length boom.

10. Apparatus according to claim 1 wherein said material removing heads are intermediate the ends of said boom when at their rest position.

11. Apparatus according to claim 10 wherein said surface material removing heads travel a substantially equal distance toward the ends of said boom during movement thereof in said opposing directions.

12. Apparatus according to claim 1 wherein said surface material removing heads travel a substantially equal distance along said boom toward their rest position during movement thereof in said opposing directions.

13. Apparatus according to claim 1 including at least one means for selectively disengaging said removal means of said heads from said tree.

14. Apparatus according to claim 13 wherein said at least one disengaging means is located at the rest position of said heads.

15. Apparatus according to claim 14 wherein said at least one disengaging means is on said boom.

16. Apparatus according to claim 15 including a disengaging means at the extreme end travel positions of said heads for disengaging said removal means of said heads from said tree after a cutting operation.

17. Apparatus according to claim 16 wherein said at least one disengaging means is on said boom.

18. Apparatus according to claim 16 including a disengaging means located at the rest position of said cutting heads.

19. Apparatus for delimbing trees according to claim 1 wherein said means for moving said surface material removing heads in opposing directions comprises:
    a pair of pulley wheels rotatably coupled at respective ends of said boom;
    elongated cable means coupled at one end to a first head, and passing around one of said pulley wheels, and coupled at the other end to the other of said heads;
and
    winding means for selectively moving said elongated cable means in a given direction relative to said boom to cause said opposing movement of said heads.

20. Apparatus according to claim 19 wherein said means for moving said heads in opposing directions comprises a second elongated cable means coupled at one end to said other of said heads, and passing around the other of said pulley wheels, and coupled at the other end to said first head.

21. Apparatus according to claim 7 wherein said boom is mounted substantially horizontally on said vehicle.

22. Apparatus according to claim 21 comprising a conveyor mounted below said boom for conveying surface material removed from a tree.

23. Apparatus according to claim 22 comprising a trough mounted adjacent said boom for guiding surface material removed from said tree onto said conveyor.

24. Apparatus according to claim 21 comprising a trough mounted adjacent said boom for guiding surface material removed from said tree to a predetermined area.

25. Apparatus according to claim 1 comprising at least one saw mounted adjacent said boom for selectively cutting said tree into predetermined lengths.

26. Apparatus according to claim 21 comprising at least one saw mounted adjacent said boom for selectively cutting said tree into predetermined lengths.

27. Apparatus according to claim 26 wherein said at least one saw is adjustably mounted along the length of said vehicle.

28. Apparatus according to claim 27 comprising means for adjusting the position of said at least one saw along the length of said vehicle.

29. Apparatus according to claim 28 wherein at least one of said surface material removing heads includes detecting means coupled to said removal means of said at least one surface material removing head for detecting the thickness of said tree.

30. Apparatus according to claim 29 comprising computing means coupled to the detecting means for adjusting the position of said at least one saw along the length of said vehicle as a function of said detected thickness.

31. Apparatus according to claim 28 comprising computing means coupled to the detecting means for adjusting the position of said at least one saw along the length of said tree as a function of said detected thickness.

32. Apparatus according to claim 21 wherein said vehicle includes a claw device for gripping trees and loading same onto said boom for removal of surface material from said tree.

33. A surface material removing head for removing surface material from trees and adapted to be movable along the length of a boom, comprising:
a frame movably coupled to said boom;
a plurality of cutter knives connected to said frame, at least one of said knives being a movable knife pivotally connected to said frame;
biasing means for biasing said movable knife in a direction so as to engage said tree between said knives; and
means mounted on said boom for selectively engaging said movable knife so as to move said movable knife against said biasing force, thereby disengaging said movable knife from said tree.

34. Apparatus according to claim 33 wherein one of said knives is fixed to said frame.

35. Apparatus according to claim 33 comprising a second movable knife pivotally coupled to said frame.

36. Apparatus according to claim 35 comprising means interconnecting said movable cutting knives so as to cause simultaneous movement of said interconnected knives toward and away from said tree.

37. Apparatus according to claim 36 wherein said means for causing simultaneous movement includes a cable means engaging and interconnecting said movable knives.

38. Apparatus according to claim 37 wherein said cable means engages a pair of wheel means respectively connected to each of said movable knives, said cable means being generally in the form of a figure "8."

39. Apparatus according to claim 35 comprising a second biasing means for biasing said second movable knife towards said tree.

40. Apparatus according to claim 39 further comprising additional means mounted on said boom for selectively engaging said second movable knife so as to move said second movable knife against said biasing force, thereby disengaging said second movable knife from said tree.

41. Apparatus according to claim 33 comprising means for detecting the position of said at least one movable knife relative to said frame, said detected position being a function of the diameter of a tree.

42. Apparatus according to claim 41 wherein said detecting means comprises means for transmitting said position to a utilization device.

43. Apparatus according to claim 41 wherein said detecting means includes first means fixed to said frame and second means engaging said first means and fixed to said at least one movable knife.

44. Apparatus according to claim 43 wherein said first means comprises a potentiometer and said second means comprises means for varying the electrical output of said potentiometer.

45. Apparatus according to claim 44 wherein said second means comprises a gear engaging a gear on said potentiometer.

46. Apparatus according to claim 1 wherein said boom is coupled to a vehicle via an upright member, said upright member being pivotally connected to said vehicle so as to be adjustable in the vertical plane irrespective of the angle of inclination of the vehicle.

47. Apparatus according to claim 2 comprising a second severing means at the other end of said boom.

48. A method for removing surface material from trees comprising:
mounting a tree on a boom structure;
engaging a pair of surface material removing heads with said tree;
moving said heads in opposing directions along the length of said boom, said head simultaneously removing surface material from the upper and lower portions of said tree.

49. The method according to claim 48 comprising severing said tree at the base thereof prior to moving said heads along said boom.

50. The method according to claim 48 comprising moving said heads toward respective ends of said boom for removing surface material from said tree.

51. The method according to claim 48 comprising disengaging said heads from said tree after moving said heads in said opposing directions.

52. The method according to claim 48 comprising cutting said tree after removal of surface material therefrom.

53. The method according to claim 52 comprising detecting the diameter of said tree.

54. The method according to claim 53 comprising cutting said tree at positions thereof along the length thereof as a function of the detected diameter.

* * * * *